United States Patent [19]
Chrabaszcz

[11] Patent Number: 6,073,133
[45] Date of Patent: Jun. 6, 2000

[54] ELECTRONIC MAIL ATTACHMENT VERIFIER

[75] Inventor: Michael P. Chrabaszcz, Milpitas, Calif.

[73] Assignee: Micron Electronics Inc., Nampa, Id.

[21] Appl. No.: 09/079,702

[22] Filed: May 15, 1998

[51] Int. Cl.[7] .................................................. G06F 17/30
[52] U.S. Cl. ........................... 707/10; 707/200; 707/513; 707/500; 709/200; 345/335
[58] Field of Search ............................... 707/530, 10, 200, 707/513; 709/200; 713/201; 345/335, 349; 363/21; 395/200.33

[56] References Cited

U.S. PATENT DOCUMENTS

| | | | |
|---|---|---|---|
| 5,283,887 | 2/1994 | Zachery | 707/513 |
| 5,613,108 | 3/1997 | Morikawa | 707/200 |
| 5,726,869 | 3/1998 | Yamashita et al. | 363/21 |
| 5,781,901 | 7/1998 | Kuzma | 707/10 |
| 5,801,700 | 9/1998 | Ferguson | 345/349 |
| 5,818,447 | 10/1998 | Wolf et al. | 345/335 |
| 5,832,208 | 11/1998 | Chen et al. | 713/201 |
| 5,900,004 | 5/1999 | Gipson | 707/530 |
| 5,903,723 | 5/1999 | Beck et al. | 707/10 |
| 5,906,656 | 5/1999 | Keller et al. | 709/200 |
| 5,937,160 | 8/1999 | Davis et al. | 707/10 |

OTHER PUBLICATIONS

Hui et al., "A Multimedia Electronic Mail System on a Heterogenous Environment," IEEE TENCON '93 Bejing, pp. 61–64.

Kowalchuk et al., "A Multicast, Multimedia News Service with Virtual Messages," IEEE, 1996, pp. 44–50.

*Primary Examiner*—Thomas G. Black
*Assistant Examiner*—Charles Rones
*Attorney, Agent, or Firm*—Park & Vaughan LLP

[57] ABSTRACT

One embodiment of the present invention provides a method for ensuring that attachments intended to be included with an electronic mail message are affixed to the message prior to release of the message from a sender's electronic mail program. This embodiment eliminates the need to initiate a follow-up transmission to forward the intended attachment. This saves the sender from potential embarrassment as well as eliminating unnecessary network traffic. In this embodiment, the method includes maintaining a modifiable list of keywords and phrases which, when found in an electronic mail message, indicate that the composer of the message intends to include an attachment with the message. Upon composition of a message, an attachment verifier scans the message for the keywords and phrases. In this embodiment, if a keyword or phrases is found in the message and no attachments have been specified, a user is alerted to the possibility that an attachment was overlooked. The user is returned to an electronic mail program so that an attachment may be specified.

20 Claims, 3 Drawing Sheets

ELECTRONIC MAIL ATTACHMENT VERIFIER

BACKGROUND

1. Field of the Invention

The present invention relates to the field of computer communications and, more specifically, to a method of ensuring that attachments to electronic mail messages are affixed to the messages prior to submission.

2. Related Art

Electronic mail, or "email," is a universal tool of computer users. It provides rapid and easy means of communication for users of all levels of skill and experience, and is heavily relied upon as a means for information transfer between individuals, businesses, and other organizations.

An electronic mail message generally consists of three sections: a header (to include addressee(s), title, classification, return address, priority, etc.), a body, and attachments (if any). Messages may contain purely textual material or may incorporate audiovisual matter as well, and are therefore frequently used as a conduit for the transportation of documents, files, programs, other electronic mail messages, etc. Such items are typically transported as attachments and must be manually selected and attached by the sending user.

Most computer users have become proficient and frequent senders of electronic mail. As a result, the volume of electronic mail transmitted has grown so large that it is no longer unusual to receive an electronic mail message that is missing a referenced attachment. The manner in which email is usually generated makes it easy to forget an attachment. Specifically, a user generally creates the header of a message (e.g., addressee(s) and title) and then composes the body. The body may be lengthy and/or the user may be interrupted during his or her message composition, thereby causing delay in finishing the message. Due to the user's focus on expressing his or her immediate thoughts within the message body, once it is completed, he or she is naturally eager to send it on its way and turn his or her attention to a new task. Thus, an attachment that was referenced in the body may easily be forgotten. Indeed, it is a rare user who has never forgotten to include an attachment before sending an email message, or who has never received a message that was missing an intended attachment.

Not only does such an oversight require the sender to create another message and send it with the proper attachment, but the sender is often embarrassed by his or her failure to affix the attachment in the original transmission. Thus, there is needed an apparatus and method for ensuring that electronic mail attachments are appended to messages before they are transmitted from the sender's electronic mail system.

SUMMARY

One embodiment of the present invention provides a method that ensures an electronic mail message is complete (i.e., that it includes any intended attachments) before the message is transmitted to its recipient(s). Ensuring that the email message is complete eliminates the need to send additional messages for the purpose of delivering forgotten attachments, thus decreasing the number of email messages the recipient(s) must read, and also avoids any embarrassment that may have resulted from the sender's oversight. This method includes program includes an attachment verifier, comprising a sequence of computer-readable instructions, that operates when a user is finished composing the message (e.g., when the user clicks on the "Send" button of the email program). Associated with the attachment verifier is a list of keywords and/or phrases which, if included in the message, tend to indicate that one or more attachments are meant to be included with the message. Keywords and phrases may be modified, added to, or removed from the list through an attachment verifier configuration module.

When the user is finished composing the message in this one embodiment, the attachment verifier scans the message for one or more of the keywords and phrases. If a keyword or phrase is found in the message, it is then determined whether any attachments are already included with the message. If a keyword/phrase is found and at least one attachment is included, or, if no keywords or phrases are found in the message, the message is transmitted normally. If, however, a keyword/phrase is found and there are no attachments specified, then a user is alerted to the possibility that he neglected to specify an intended attachment and is returned to the email program for the purpose of adding one or more attachments. Typically, the email program would jump to an attachment component is the user acknowledges his negligence. Afterward, the message is again scanned for each of the keywords and phrases.

In another embodiment of the present invention, the email message is only scanned for keywords or phrases if the message has no specified attachments.

In yet another embodiment of the present invention, the attachment verifier identifies the need for multiple attachments and prompts the user for one or more additional attachments if an insufficient number have been specified by the user.

In another embodiment of the invention, the keywords and phrases are prioritized according to statistical data reflecting the accuracy of each keyword or phrase in indicating the need for an attachment. In other words, appropriate data is accumulated each time a message is scanned for keywords and phrases, the data reflecting whether or not each located keyword/phrase correctly determined the need for an attachment to the message. This determination may be made, for example, by observing whether the user adds an attachment after being alerted to the possibility that an attachment was forgotten. Based on this data, a level of certainty or probability of correctness is computed as to whether or not an attachment is actually needed when a keyword or phrase is found in a message.

In yet a further embodiment of the present invention, the attachment verifier comprises a sequence of computer-readable instructions separate from the electronic mail program.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Description of an Electronic Mail Environment

Figure 1:
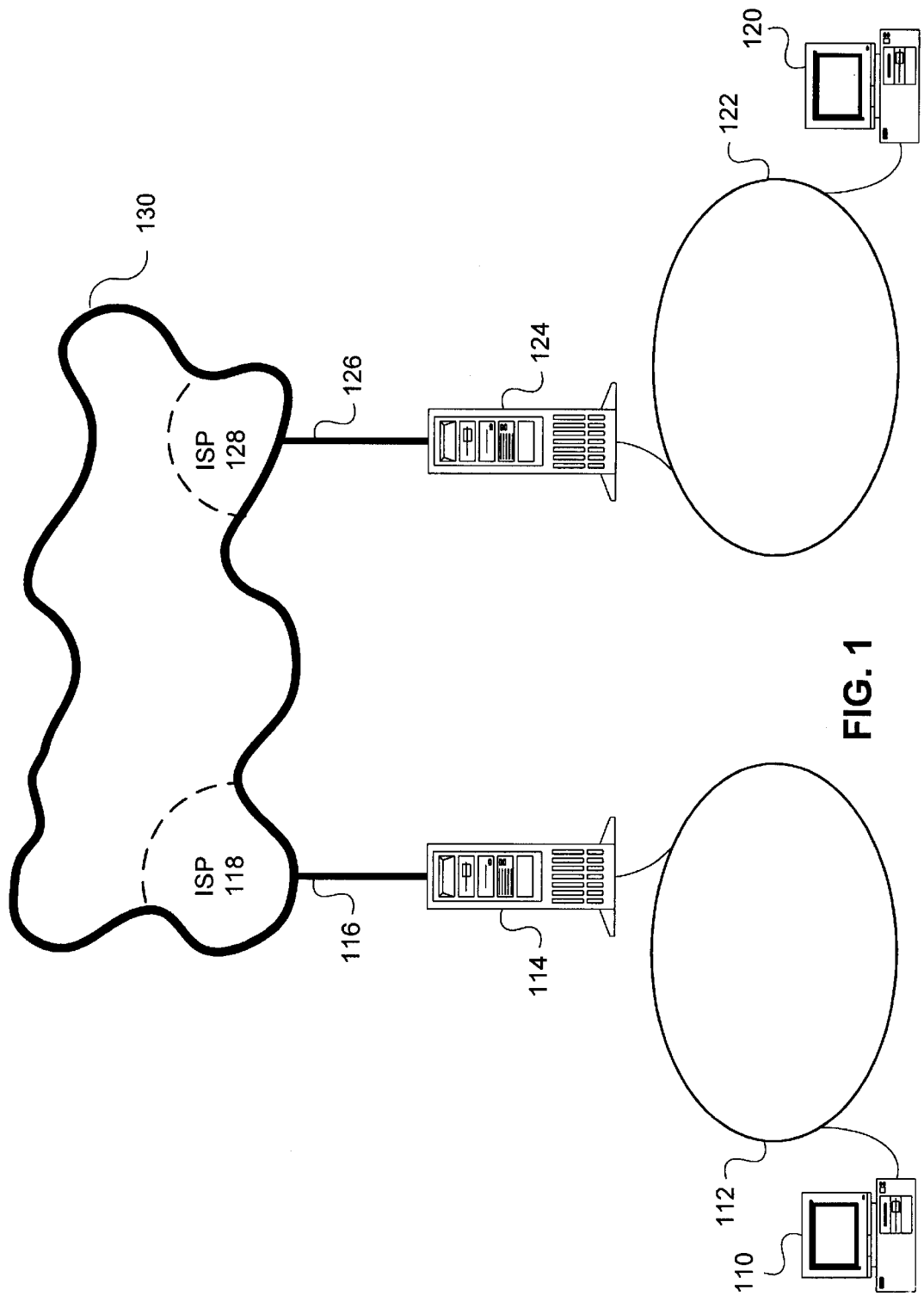
FIG. 1 illustrates an electronic mail environment in accordance with an embodiment of the present invention.

FIG. 1 illustrates some components of an electronic mail environment according to one embodiment of the invention, in which email is generated by a computer user at one computer system for transmission to another computer user at a remote computer system. In the illustrated embodiment, computer systems 110 and 120 are situated within local area networks ("LANs") 112 and 122, respectively. LANs 112 and 122 include servers 114 and 124, and are coupled via communication links 116 and 126, and Internet 130. In an alternative embodiment, optional internet service providers ("ISPs") 118 and 128 connect communication links 116, 126 to Internet 130.

In another embodiment of the present invention, Internet 130 is replaced by other means of interconnecting LANs, such as a router, a gateway, a bridge, or a wide area network. In yet another embodiment, computer systems 110 and/or 120 connect directly to communication links 116 and 126, without LANs 112 and 122, and servers 114 and 124. Note that ensuring the inclusion of attachments to email messages does not depend upon a specific electronic mail environment configuration, and computer systems 110, 120 may even be situated within a single network.

Computer systems 110, 120 are illustratively microcomputers offering electronic mail services to users through appropriate electronic mail programs. The electronic mail programs are any of a variety of suitable products, such as Microsoft Mail, Lotus cc:Mail, Novell Groupwise, etc. Computer systems 110, 120 also execute suitable operating systems and graphical user interfaces with which the electronic mail programs operate. Suitable operating systems and interfaces include Windows, Windows NT, DOS, Unix, Sun OS, Macintosh OS, etc. In normal operation, a user at computer system 110 or 120 selects icons, commands, or menu entries offered by the email program and/or operating system or interface in order to perform desired functions. The functions provided by the icons and commands allow the user to: compose, display, or send a message; attach a file to an outgoing message; determine if email has been delivered; configure the email program or operating system; or enter or exit the email program.

LANs 112, 122 may employ any topology (e.g., Ethernet, Token Ring, FDDI) and network operating system (e.g., Netware, LANManager, Windows NT). Servers 114 and 124 are configured to receive and transmit electronic mail from, to and within LANs 112 and 122, respectively. In one embodiment of the present invention, communication links 116, 126 are dedicated high-bandwidth connections, In another embodiment, they may, instead, comprise dial-up modem connections or other non-dedicated links.

In the embodiment illustrated in FIG. 1, an electronic mail sender at computer system 110 operates a first electronic mail program to compose an electronic mail message for transmission to a recipient at computer system 120. From the sender's computer system 110, the electronic mail message is transmitted via LAN 112 to server 114. At server 114, a message transfer agent formats the message as necessary to prepare it for transmission over communication link 116. Internet 130 receives and forwards the message, eventually routing it over communication link 126 to server 124. Another message transfer agent on server 124 prepares the message for delivery and forwards it across LAN 122 to computer system 120 where it is read by the recipient. A second electronic mail program is used by the recipient to access the message. The second email program used by the recipient may be the same as or different than the first email program used by the sender.

The first electronic mail program allows various types of information to be included and transmitted with an electronic mail message. Some examples include word processing documents, graphic images, audio files, other email messages, etc. Such files are "attached" to the body of a message created by the user. To connect an attachment to a message, the sender identifies the file and specifies that it is to be attached. Typically, the body of an email message that is meant to include an attachment will refer to the attachment in some manner. For example, a phrase similar to one of the following may be present in the body of the message: "Please see the attached document," "Here is a copy of the latest version," "I have attached a copy for your review," "The attachments are in bitmap format," "Enclosed you will find . . . ," "I am sending you . . . ," etc. When, however, the sender neglects to attach the promised files or documents, he must later generate another message with which to forward the files or documents. In addition, he will likely be embarrassed by the oversight—particularly when the recipient is the first to discover that an attachment was omitted.

Description of an Electronic Mail Attachment Verifier

In light of the ease with which a user can forget to include an attachment with an email message, and the confusion, embarrassment and duplication of effort that result, an electronic mail attachment verifier is provided to ensure that when the sender intends to include an attachment with a message, the attachment is connected before the message is transmitted to the recipient. In one embodiment of the invention, the attachment verifier parses a user's composed message to scan for a list of keywords or phrases within the body and/or the title of the electronic mail message. If a keyword or phrase is found, and the message does not already include a referenced attachment, the user is offered an opportunity to select one or more attachments to be included in the message. The keywords and phrases for which the email attachment verifier searches, such as the examples listed above, reflect words and/or phrases often found in messages that are meant to include one or more attachments. User may modify, add, and delete keywords/phrases, based on an initial configuration provided with the attachment verifier at the time of its installation, and the attachment verifier can be enabled or disabled as desired.

By modifying the keywords for which a message is to be scanned, a user is able to increase the likelihood that the attachment verifier will correctly identify messages that are missing attachments. The user may, for example, refer to attachments with different words/phrases or in a different language from that which would be recognized using the system administrator's default configuration.

One Embodiment of an Electronic Mail Attachment Verifier

Figure 2:
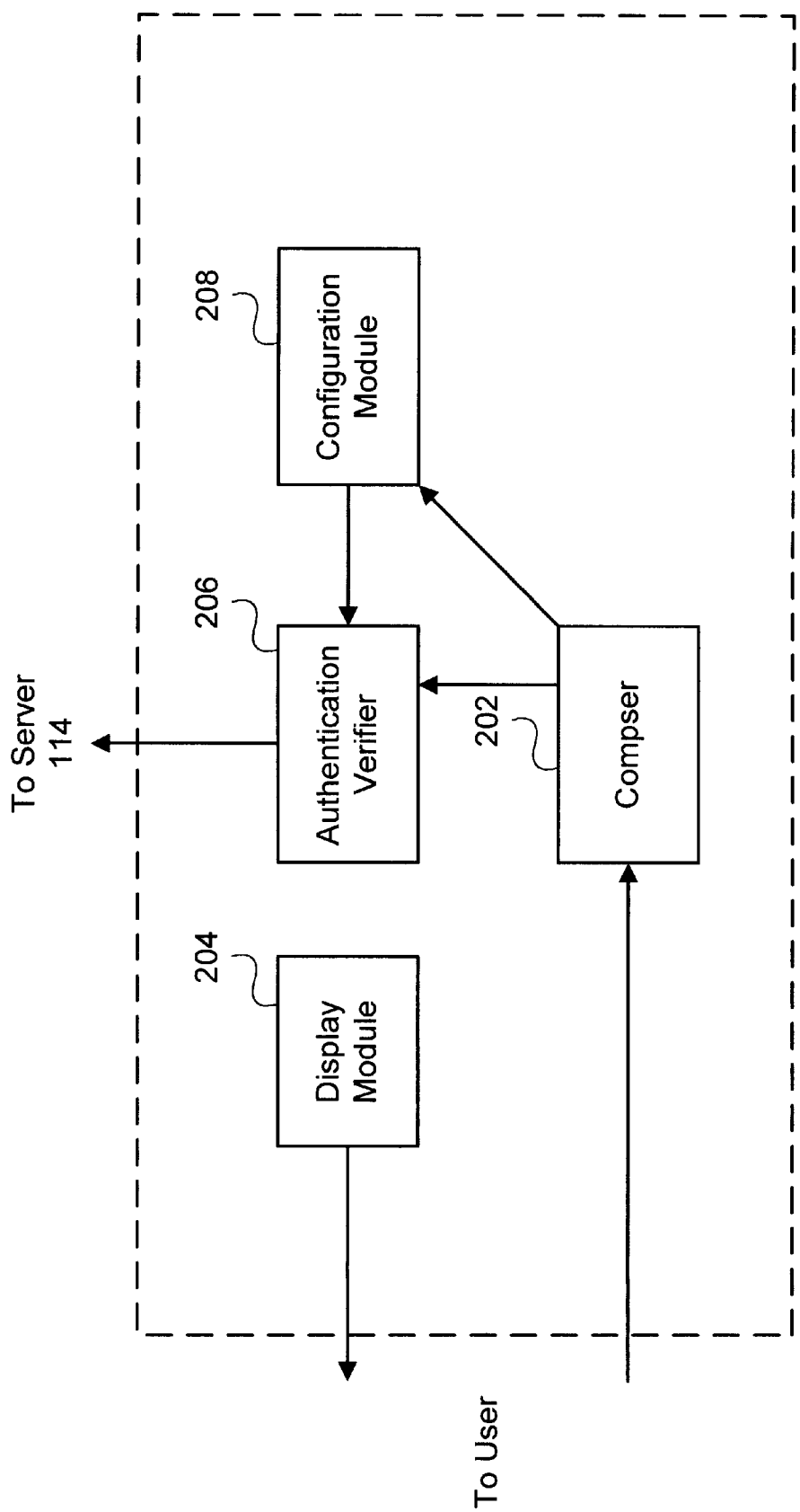
FIG. 2 depicts the components of an illustrative electronic mail program, including an electronic mail attachment verifier, in accordance with an embodiment of the invention.

With reference now to FIG. 2, an illustrative configuration of a first electronic mail program 200 executing on computer system 110 is depicted, including an electronic mail attachment verifier according to one embodiment of the present invention. First email program 200 comprises the following elements: composer 202, display module 204, attachment verifier 206, and attachment verifier configuration module 208. Email program 200 may, of course, incorporate other elements, not pictured in FIG. 2.

Composer 202 receives input from an email user to create an electronic mail message. Composer 202 may, illustratively, be a word processing program or an editor that is built into first email program 200. Using composer 202, a user drafts the body of an electronic message, identifies one or more addressees, specifies attachments to be included, and selects any desired parameters for transmission and/or delivery of the message (e.g., set a priority level, request a delivery receipt, specify delivery on a certain date). Electronic mail composer 202 receives the command from the user to post a message (e.g., initiate the "Send" command), at which time attachment verifier 206 is activated, as discussed below.

Display module 204 displays an electronic mail message for the user. Display module 204 is typically invoked by a user when a new mail message is received, but is also invoked to display old messages as well. New email is received by the program from the message transfer agent executing on server 114. Display module 204 may alert the user to the receipt of new email or another portion of first electronic mail program 200 may perform that function.

Attachment verifier 206 ensures that attachments to electronic mail messages are connected to the messages before they are transmitted to the message transfer agent operating on the user's LAN server 114. As described above, attachment verifier 206 maintains a list of keywords and phrases which, when found in the body of a message, tend to indicate that the sender is transmitting one or more attachments. After composer 202 has composed a new outgoing message and the user issues the "Send" command or its equivalent, attachment verifier 206 scans the message and determines whether the user neglected to connect an attachment. Specifically, attachment verifier 206 quickly scans the email message for each of the specified keywords and phrases. If a match is found, and if an attachment is not already included with the message, the user is alerted and asked if he or she wishes to include an attachment. If the user chooses to add an attachment, he or she is returned to the point within first electronic mail program 200 where he or she may add attachments and edit the body of the message. This may be the portion of first email program 200 that is normally executed when a user clicks on the "Attachment" icon or command (or its equivalent). When the user next requests the message be sent (e.g., the "Send" command is again selected), after having the chance to add an attachment, the attachment verifier scans the message again to ensure that the missing attachment was indeed connected.

If, however, attachment verifier 206 failed to find a match for any of its keywords or phrases in the outbound message, or if the user chose not to add an attachment after being prompted to do so, attachment verifier 206 allows the "Send" command to complete, in which case the message is delivered to the message transfer agent on the user's LAN server 114 without an attachement.

In the presently-described embodiment of an email attachment verifier, the verifier is incorporated into first electronic mail program 200, and thus, has an interface and method of operation matching the rest of the program. Also, as initially installed, first email program 200 includes an initial list of keywords or phrases that are likely to indicate that the user intends to affix an attachment. The initial keywords/phrases may illustratively be established by a system administrator responsible for computer system 110 and/or LAN 112, or by the distributor of first email program 200.

Electronic mail attachment verifier configuration module 208 manages the configuration of attachment verifier 206. Through a configuration menu of first email program 200, the user may add, remove, or edit individual keywords and phrases and may enable and disable execution of the attachment verifier as desired. A user may refer to attachments in a unique manner, in which case he or she will add words/phrases to the attachment verifier's list. In the event that a user often employs language matching one or more keywords/phrases even when not intending to include an attachment, he or she may remove the offending list entry or entries in order to decrease the incidence of false positive matches. The list of keywords and phrases may simply take the form of a text file, although a database or other structured file is also contemplated.

In an alternative embodiment of the invention, the user may choose to restore the default set of keywords and phrases. In another alternative embodiment, rather than being incorporated into a host email program, the attachment verifier comprises a set of executable instructions that are invoked whenever a user selects the "Send" command (or its equivalent) from his or her email program. This embodiment may operate as a Terminate-and-Stay-Resident ("TSR") routine or may be loaded into memory for execution each time an email message is sent.

Figure 3:
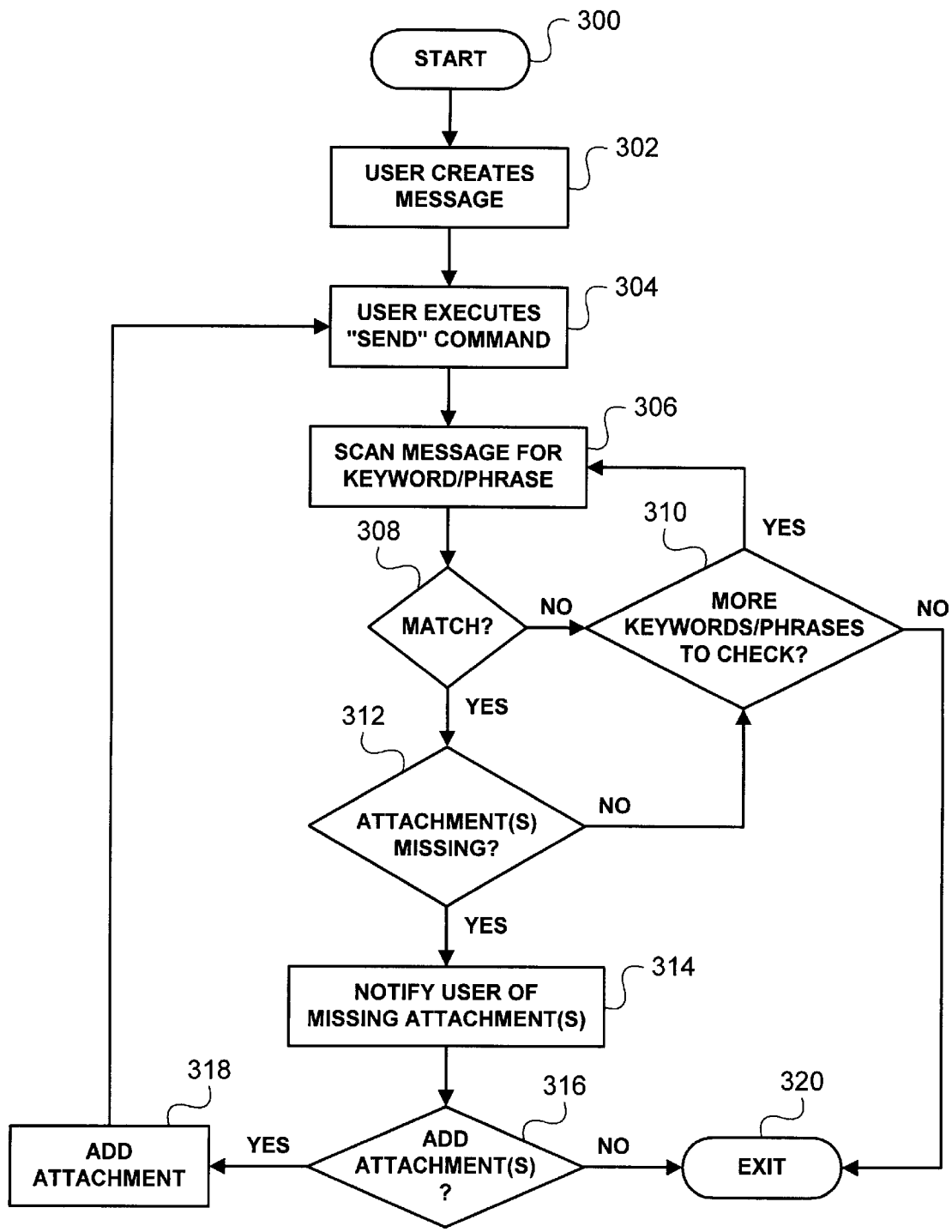
FIG. 3 is a flowchart depicting the operation of an electronic mail attachment verifier, in accordance with an embodiment of the present invention.

The specific operation of a present embodiment of an electronic mail attachment verifier is now described with reference to FIG. 3. In step 300, first email program 200 is initialized and prepared for use. If email program 200 is being used for the first time on computer system 110, step 300 includes the process of installing the program along with an initial list of keywords and phrases to be used by the attachment verifier.

While first electronic mail program 200 is operating, the user creates (step 302) a new message. In the creation process, the user specifies one or more recipients, provides a title for the message, and composes the content of the message. When completed, the user executes (step 304) the program's "Send" command or its equivalent, which indicates that the user has completed his composition process and now wants the message delivered to the identified recipient(s).

Execution of the "Send" command activates a present embodiment of an email attachment verifier which immediately scans (step 306) the message for a first keyword or phrase in its keyword list. If no match is found (step 308), the attachment verifier determines whether all keywords and phrases in its keyword list have been compared to the message. If so, the verifier exits (step 320); otherwise, it scans the message for the next candidate keyword or phrase. Until either a match is found or all keywords and phrases are searched for, steps 306–310 repeat.

In the presently-described embodiment, the attachment verifier stops searching and proceeds to step 312 upon the detection of a first keyword or phrase in the message. In an alternative embodiment, however, the attachment verifier searches the message for additional (or all) keywords and phrases even after a first match is detected.

When a match is found (step 308), the attachment verifier determines (step 312) whether the user has included any attachments in the message or identified any attachments to be included in the message. If the user has already included or identified one or more attachments, then the search process resumes at step 310. In the alternative embodiment whereby the attachment verifier searches for all of the keywords and phrases in step 308 before proceeding to step 312, if no attachments are missing then the attachment verifier proceeds to step 320 and exits.

In a further alternative embodiment, the attachment verifier may determine whether the user's email message includes any attachments before scanning for any keywords or phrases. In this alternative embodiment, the message is scanned for the keywords and phrases only when the message has no attachments.

If the user has not included or specified any attachments for inclusion in the message (step 312), however, the user is notified (step 314) that he or she may have neglected to connect one or more intended attachments to the message.

After the notification in step 314, the user is asked (step 316) whether an attachment should be included. If the user answers in the negative, the attachment verifier exits at step 320. If the user answers in the positive, he or she is returned (step 318) to the point in first email program 200 at which attachments may be specified. When done choosing or identifying attachments, the user will again execute the "Send" command (step 304), after which steps 306–320 are performed, as necessary, in order to ensure that desired attachments were actually added.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

For example, one of skill in the art will recognize that although the email attachment embodiments described above were represented as being in operation on a user's local computer system, such as computer system 110, other embodiments could operate equally effectively from a network server, such as server 114, or other central location. Other embodiments may operate from remote access devices that submit email, such as an ISP (Internet Service Provider).

As another example, one of skill in the art will recognize that the embodiments of the invention described above may easily be modified in order to collect statistical data concerning the most effective keywords or phrases for determining when attachments are and are not meant to be included with a message. An attachment verifier such as that described in conjunction with FIGS. 2 and 3 above could, therefore, be modified so as to collect information concerning the accuracy and effectiveness of the keywords and phrases whenever an email message is sent and ensure that the most effective keywords and phrases are included in the list of keywords and phrases used by the attachment verifier. In addition, the keywords/phrases may be weighted in accordance with collected data in order to provide a range of certainty for the determination that a user has neglected to add an attachment to an outgoing message.

What is claimed is:

1. A program storage device storing instructions that when executed by a computer perform a method for handling electronic mail in a computer system operated by a user, the method comprising:

receiving an input from the user;

using the input to create an electronic mail message;

maintaining a list of attachment indicators, attachment indicators in the list indicating a possible need for an attachment to the electronic mail message;

searching text within the electronic mail message for a first attachment indicator from the list of attachment indicators;

determining whether the electronic mail message includes the attachment;

if the electronic mail message includes the first attachment indicator and does not include the attachment, prompting the user to add the attachment to the electronic mail message; and transmitting the electronic mail message.

2. A computer system that verifies completeness of an electronic mail message, comprising:

a first memory for storing attachment indicators, the attachment indicators indicating a possible need for an attachment to the electronic mail message;

a processor for scanning electronic mail message to locate attachment indicators from the first memory;

an accumulator for accumulating the number of attachment indicators located within the electronic mail message; and a verification mechanism that verifies the completeness of the electronic mail message by examining a contents of the accumulator to determine whether the electronic mail message has a possible need for the attachment, and determining whether the electronic mail message includes the attachment.

3. The computer system of claim 2, further comprising a list modifying mechanism that modifies the list of attachment indicators to reflect a mail program usage pattern of a user.

4. The computer system of claim 2, further comprising an error indicating mechanism that generate an error signal if the accumulator indicates that the electronic mail message includes an attachment indicator and the electronic mail message does not include the attachment.

5. The computer system of claim 2, further comprising a prompting mechanism, that prompts a user to add the attachment to the electronic mail message if the accumulator indicates that the electronic mail message includes an attachment indicator and the electronic mail message does not include the attachment.

6. A method for handling electronic mail in a computer system operated by a user, the method comprising:

receiving an input from the user;

using the input to create an electronic mail message;

maintaining a list of attachment indicators, attachment indicators in the list indicating a possible need for an attachment to the electronic mail message;

searching text within the electronic mail message for a first attachment indicator from the list of attachment indicators;

determining whether the electronic mail message includes the attachment;

if the electronic mail message includes the first attachment indicator and does not include the attachment, prompting the user to add the attachment to the electronic mail message; and transmitting the electronic mail message.

7. The method of claim 6, further comprising receiving a command from the user to add the attachment to the electronic mail message.

8. The method of claim 6, further comprising modifying the electronic mail message to include the attachment.

9. The method of claim 6, further comprising searching text within the electronic mail message again for the first attachment indicator.

10. The method of claim 6, further comprising searching the text within the electronic mail message for a second attachment indicator from the list of attachment indicators.

11. The method of claim 6, further comprising modifying the list of attachment indicators.

12. The method of claim 6, further comprising:

determining whether the user added the attachment to the electronic mail message in response to being prompted; and saving information concerning the first attachment indicator and whether the user added the attachment.

13. The method of claim 12, further comprising using the saved information to prioritize an ordering of attachment indicators in the list of attachment indicators.

14. The method of claim 6, further comprising modifying the list of attachment indicators to reflect a mail program usage pattern of the user.

15. The method of claim 6, wherein searching the text within the electronic mail message includes concurrently searching for the first attachment indicator and a second attachment indicator from the list of attachment indicators.

16. The method of claim 6, wherein searching text within the electronic mail message for the first attachment indicator includes searching the text for a sequence of alphanumeric characters.

17. The method of claim 6, further comprising generating an error signal if the electronic mail message does not include the attachment.

18. A method for handling electronic mail in a computer system operated by a user, the method comprising:

receiving an input from the user;

using the input to create an electronic mail message;

maintaining a list of attachment indicators, attachment indicators in the list indicating a possible need for an attachment to the electronic mail message;

searching text within the electronic mail message for attachment indicators from the list of attachment indicators;

determining whether the electronic mail message includes the attachment; and if the electronic mail message does not include the attachment and includes at least one attachment indicator from the list of attachment indicators,
indicating to the user that the attachment is missing,
possibly receiving a command from the user to add the attachment to the electronic mail message, and
adding the attachment to the electronic mail message;
and transmitting the electronic mail message.

19. The method of claim 18, further comprising periodically modifying the list of attachment indicators to reflect a mail program usage pattern of the user.

20. The method of claim 18, wherein searching text within the electronic mail message includes searching the text for a sequence of alphanumeric characters.

* * * * *